(12) United States Patent
Furuya et al.

(10) Patent No.: US 6,486,579 B1
(45) Date of Patent: Nov. 26, 2002

(54) ELECTROMAGNETIC VIBRATOR AND PORTABLE DEVICE EMPLOYING THE SAME

(75) Inventors: Miyuki Furuya, Tottori (JP); Norishige Moritan, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 4 days.

(21) Appl. No.: 09/702,211

(22) Filed: Oct. 31, 2000

(30) Foreign Application Priority Data

Mar. 27, 2000 (JP) ........................................ 2000-086137

(51) Int. Cl.$^7$ ................................................. H02K 7/06
(52) U.S. Cl. ........................................................ 310/81
(58) Field of Search ............................... 310/81, 15, 12, 310/29, 71, 36, 89, 91, 40 MM; 340/7.6, 407.1, 331.1, 825.46, 391.1, 384.1, 396, 349

(56) References Cited

U.S. PATENT DOCUMENTS

| | | | | |
|---|---|---|---|---|
| 4,864,276 A | | 9/1989 | Tribbey et al. ................ 310/81 |
| 5,668,423 A | * | 9/1997 | You et al. ...................... 310/81 |
| 5,894,263 A | * | 4/1999 | Shimakawa et al. ...... 340/388.1 |
| 5,942,833 A | * | 8/1999 | Yamaguchi ................... 310/81 |
| 6,208,238 B1 | * | 3/2001 | Ohta ......................... 340/391.1 |
| 6,317,032 B1 | * | 11/2001 | Oishi ....................... 340/311.1 |

\* cited by examiner

Primary Examiner—Tran Nguyen
(74) Attorney, Agent, or Firm—RatnerPrestia (57) ABSTRACT

An electromagnetic vibrator includes a movable body producing vibration by revolving motion or reciprocating motion with respect to its center axis through being powered from the outside. The vibrator also includes an outer shell supporting the moving body and having two mounting faces, one being vertical and the other being parallel to the center axis. A portable device employs this electromagnetic vibrator. This structure allows the portable device to gain vibration in either direction, thereby increasing the versatility of the device. When a plurality of the electromagnetic vibrators are mounted to a device with their center axes in different directions or in the same direction, vertical and lateral vibrations can be produced at the same time, so that the device owns complex vibration modes and performs versatile functions.

6 Claims, 6 Drawing Sheets

ELECTROMAGNETIC VIBRATOR AND PORTABLE DEVICE EMPLOYING THE SAME

FIELD OF THE INVENTION

The present invention relates to an electromechanical vibration generator and more particularly, it relates to a mini-electromagnetic vibrator fit to a portable electronic device and a device employing the same vibrator.

BACKGROUND OF THE INVENTION

Among portable devices such as cellular phones, personal data assistants, amusement devices, and health instruments, electromagnetic vibrators (hereinafter also referred to just as a vibrator) are integrated in those devices to transmit the vibration to the carriers of those devices. Many of the vibrators are made up by adding eccentric gravity to a rotor of a mini direct current motor (hereinafter referred to as a vibration motor). Both of a flat shape and a slender shape have been available in the conventional vibration motors.

A rotational shaft of the slender shape vibration motor lies in a longitudinal direction. The vibration motor, in general, is mounted parallel to the longitudinal direction of a device. Accordingly, the device vibrates in a direction vertical to the longitudinal direction. This type of vibration motor fits to a device to be downsized because it generates required vibration although it has relatively a small cubic volume. On the other hand, the rotational shaft of the flat shape vibration motor, in general, stands vertical to a plane where the motor is mounted. The plane is usually mounted parallel to the longitudinal direction of the device, therefore, the device vibrates in a direction parallel to its longitudinal direction. This motor fits to a device requiring large vibration because it can generate large vibration thanks to gaining a fairly long rotational radius considering its thinness.

As such, those two types of motor have both good and bad points, thus the type of motor has been selected depending on an application of a device. However, versatile requirements arise from the market, and the same device needs different modes of vibration. In this case, those conventional vibration motors often require the housing of the device to be modified responsive to a vibration mode needed, thus they cannot deal with the market requirements so quickly. The market, therefore, needs a vibrator which can generate vibration in either direction to satisfy those requirements.

The market still needs a novel vibration mode to produce some reality in e.g. amusement devices. For instance a vehicle needs to simulate rolling, yawing and pitching with corresponding types of vibration, or three-dimensional vibration which needs more complex technique. Because the market demands such devices, a mini vibrator that can generate vibration in any directions is also required.

SUMMARY OF THE INVENTION

The present invention addresses the problems discussed above and aims to contribute to realizing such devices having well-advanced.

An electromagnetic vibrator of the present invention comprises the following elements:
(a) a movable body revolving or reciprocating with respect to a center axis by being powered from outside; and
(b) an outer shell supporting the movable body and including two mounting faces—one is vertical and another is parallel to the center axis.

A portable device of the present invention includes the electromagnetic vibrator discussed above.

This structure allows the vibrator to generate vibration in either direction, and contribute to increasing versatility of the device.

Another portable device of the present invention has a plurality of electromagnetic vibrators in which movable bodies perform either one of revolving or reciprocating movement with respect to the center axes to generate vibration. The plurality of electromagnetic vibrators are mounted to the device with their center axes lying in specific different directions or in the same direction.

This structure allows vibrators to have complex vibration modes such as generating vertical and lateral vibrations at the same time, and contribute to realizing a device of well-advanced functions.

DETAILED DESCRIPTION OF THE EXEMPLARY EMBODIMENTS

Exemplary embodiments of the present invention are demonstrated hereinafter with reference to the accompanying drawings.

(First Exemplary Embodiment)

Figure 1:
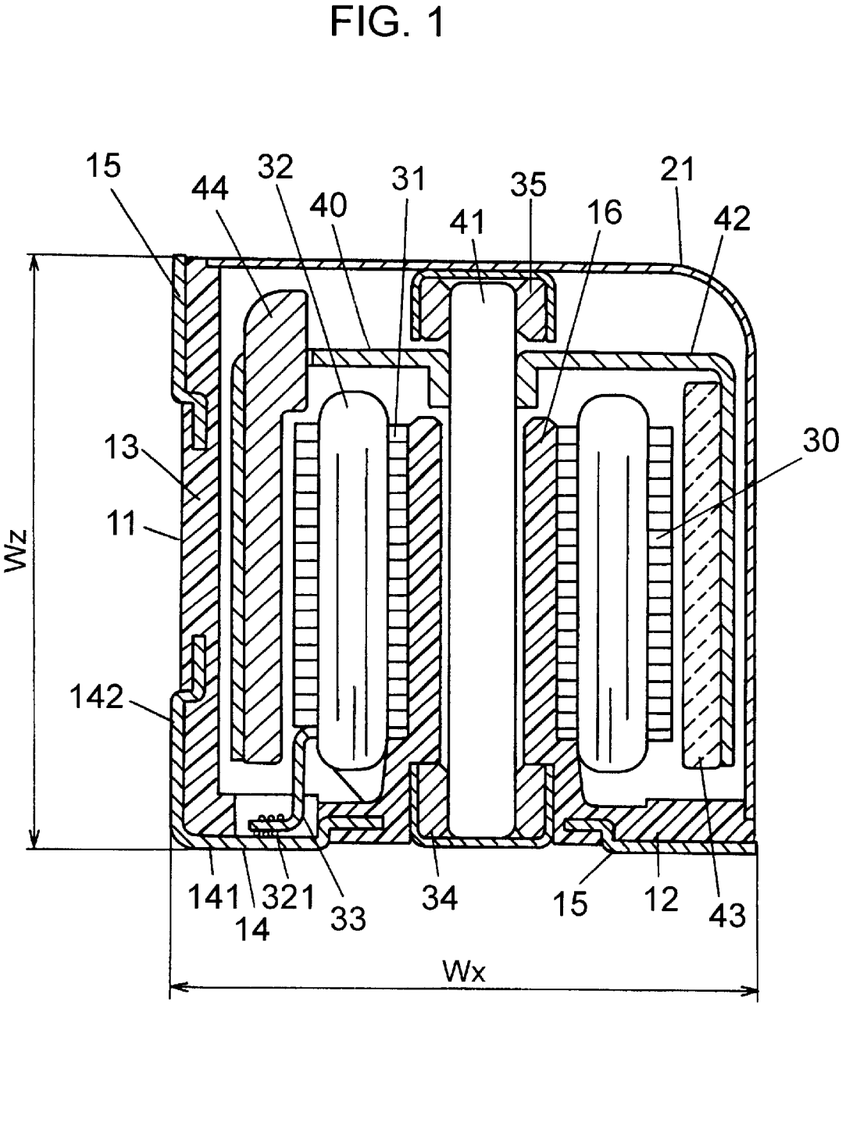
FIG. 1 is a lateral cross section illustrating a structure of an electromagnetic vibrator in accordance with a first exemplary embodiment of the present invention.
Figure 2:
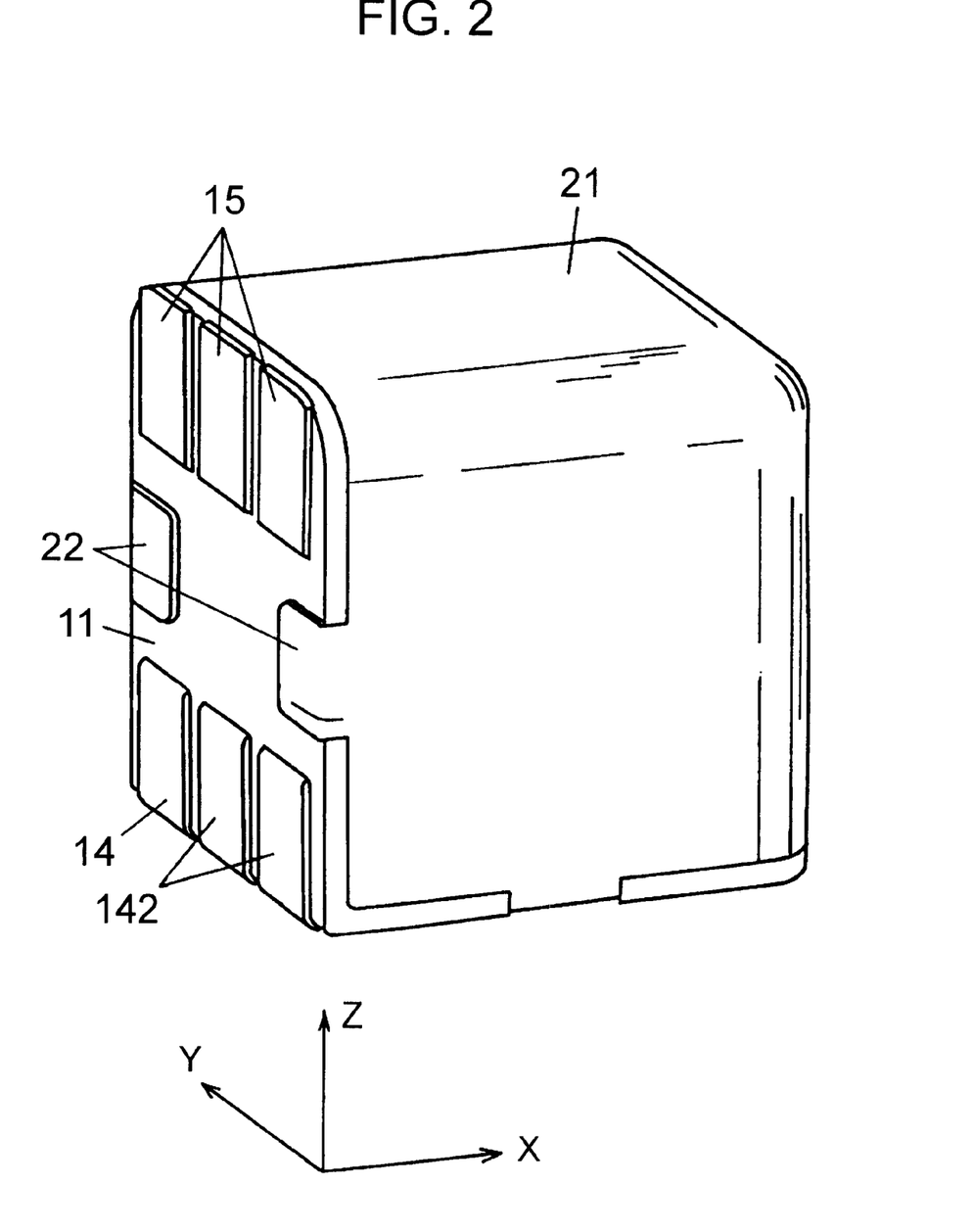
FIG. 2 is a perspective view of the electromagnetic vibrator in accordance with the first exemplary embodiment of the present invention.
Figure 3:
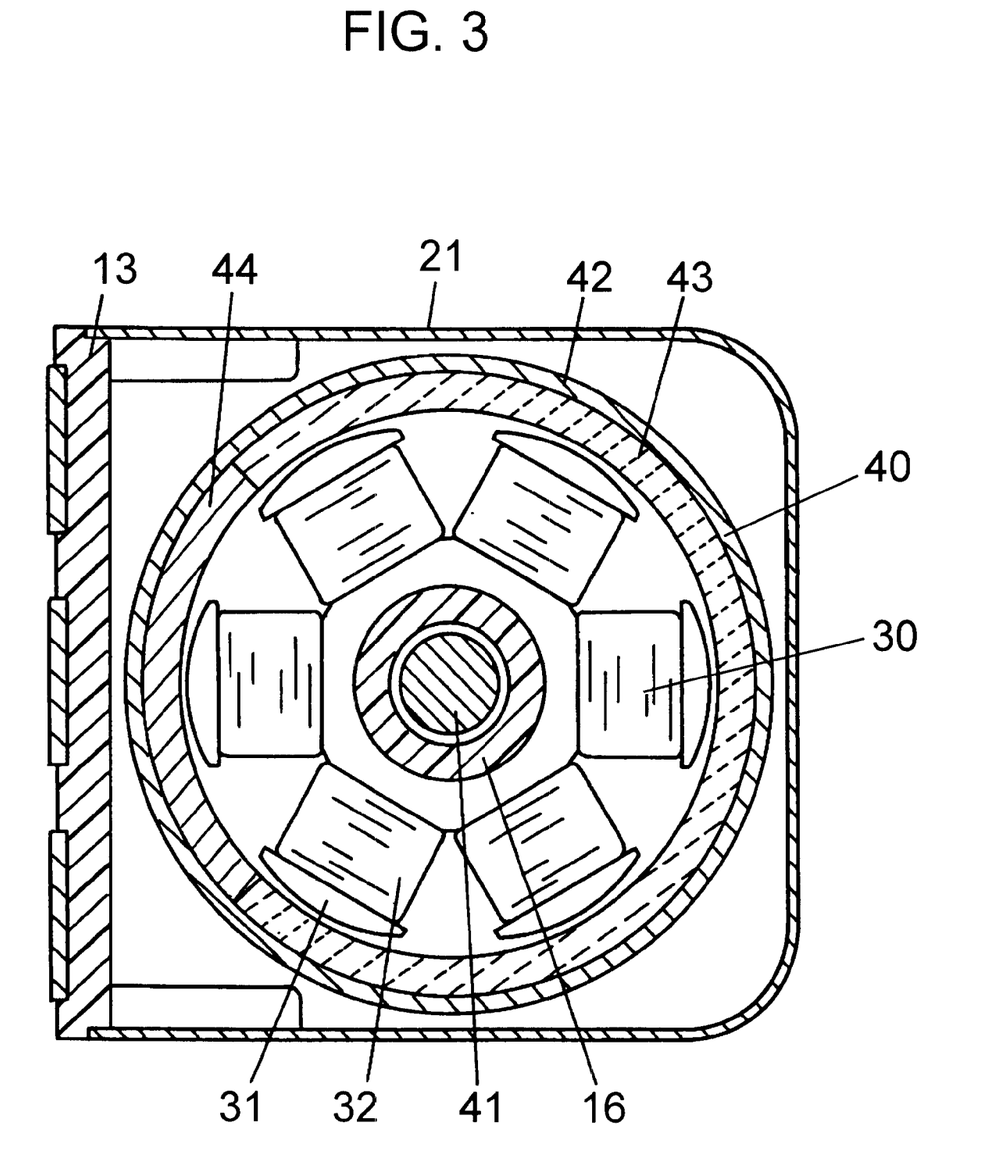
FIG. 3 is a plan cross section of the electromagnetic vibrator in accordance with the first exemplary embodiment of the present invention.

FIG. 1 is a lateral cross section illustrating a structure of an electromagnetic vibrator in accordance with the first exemplary embodiment of the present invention. FIG. 2 is a perspective view of the same electromagnetic vibrator. FIG. 3 is a plan cross section of the same electromagnetic vibrator.

As shown in FIG. 2, an outlook of the vibrator is a cube that measures as small as 7×7×6.5 mm. This vibrator can be mounted to a device using its X-Y plane and Y-Z plane. On these mounting faces, electrical coupling terminal 14 and mechanical coupling terminal 15 are disposed. Either one of these mounting faces can be reflow-soldered to a board of the device.

FIG. 1 is a cross section taken on X-Z plane, in which a center axis runs, of the vibrator shown in FIG. 2. As shown in FIG. 1, an outer shell of the vibrator comprises base 11 made of molded resin and cover 21 made of thin metal, and houses a vibration motor which employs a mini dc motor. Base 11 comprises bottom plate 12 which functions as a mounting face and side plate 13 vertically adjacent to bottom plate 12. Insert-molding terminals made of metallic plate into the resin-made base forms base 11. Electric coupling terminals 14 out of the metallic terminals lie at a corner where bottom plate 12 intersects side plate 13, and the other are mechanical coupling terminals 15, or vice versa. Electrical terminal 14 has terminal 141 on the bottom plate and terminal 142 on the side plate. These two terminals shape in the same and connect each other both electrically and mechanically, so that terminal 141 or terminal 142 functions in the same manner when either one of them is used for mounting to the device. Part of mechanical terminal 15 is exposed from edge of bottom plate 12 or side plate 13. This is a trace of cutting-off the metallic plate held when the insert-molding is performed.

Pipe-like supporter 16 supporting stator 30 (driving section of the vibration motor) protrudes from bottom plate 12 toward inside. This supporter supports a driving section of the vibration motor. The vibration motor comprises rotor 40 (revolving part) and stator 30 (non-revolving, driving part). Stator 30 is fixedly mounted to an outer wall of supporter 16, and comprises stator core 31, winding 32, and wire-terminating-terminal 33. Winding terminal 321 is coupled to electric coupling terminal 141.

Rotor 40 comprises shaft 41 at the revolving center, cup-shaped rotor frame 42 fixedly mounted to shaft 41, magnet 43 fixedly mounted on an inner wall of rotor frame 42, and eccentric weight 44 mounted to rotor frame 42. Eccentric weight 44 is made of metal having a large specific gravity such as tungsten alloy. Eccentric weight 44 extends through a hole punched through upper plate of rotor frame 42 so that eccentric volume increases. A first end of shaft 41 is journaled by lower bearing 34 mounted to bottom plate 12, and a second end is journaled by upper bearing 35 mounted to an inner face of cover 21.

FIG. 3 is a plan view illustrating a structure of this vibrator. Stator 30 lies at the center of the vibrator and rotor 40 surrounds stator 30. Rotor 40 includes rotor frame 42—the outer most rim, magnets 43 and eccentric weight 44 both fixedly mounted to the inner wall of frame 42. Magnet 43 occupies about three quarters of the entire rim of rotor frame 42, and eccentric weight 44 takes about a quarter. Both are rested in the same rotating field. This structure allows the vibrator to gain large rotating torque with a little cogging torque within a fairly small room, so that the vibrator gains large eccentric volume. FIG. 3 also shows side plate 13 of the base and cover 21—outer shell. Side plate 13 includes terminals insert-molded. These terminals slightly protrude from resin surface so that they can be conveniently used for reflow soldering.

An assembly process of this vibrator is demonstrated hereinafter with reference to FIG. 1. Before the assembly, rotor 40 must be sub-assembled as shown in FIG. 1. Then stator 30 is fixed to the outer wall of pipe-like supporter 16, and winding terminal 321 at wire-terminating-terminal 33 is soldered or welded to the inner face of electric coupling terminal 14. After this, lower bearing 34 is fixed to bottom plate 12 of the base and upper bearing 35 to the inner wall of cover 21. Then rotor 40 is inserted into supporter 16 so that the first end of shaft 41 fits to lower bearing 34, and cover 21 is put so that the second end of shaft 41 fits to upper bearing 35. Finally tabs 22 of cover 21 are bent to the mounting face as shown in FIG. 2 so that cover 21 is coupled to base 11 to complete the vibrator. The height of tabs 22 bent is approx. the same as that of other terminals, so that tabs 22 bent function as mechanical coupling terminals, and bond cover 21 directly to a board of the device. Thus the device and the vibrator are coupled each other firmly with high reliability.

As discussed above, in the first embodiment, the outer shell of the electromagnetic vibrator has two mounting faces, i.e. one is bottom plate 12 vertical to a center axis and the other is side plate 13 parallel to the center axis. Therefore the vibrator can be mounted to a device in two ways with the center axis lying in two different directions. Thus the vibrator can provide the device with vibration in either direction by just changing the mounting direction. The electromagnetic vibrator can meet two different requirements with the one specification, so that every phase from manufacturing equipment to marketing of the device can be streamlined.

The "center axis" means an axis of kinetic mechanics, to be more specific, it refers to as a rotational axis in revolving motion, and an axis indicating a moving direction in reciprocating motion. The outer shell, if it is closed shape, can protect the inside; however, it is not necessarily to be closed.

Since the vibrator has electric coupling terminals on its mounting faces, the vibrator can be directly bonded by e.g. soldering to the board of the device. Also the vibrator has mechanical coupling terminals on its mounting faces, it can gain strong bonding force responsive to the bonding material. The vibrator in accordance with this first embodiment has both of electric coupling terminal 14 and mechanical coupling terminal 15 on its mounting faces, and yet, mechanical bonding force can be expected from electric coupling terminal 14 in addition to that from terminal 15. Therefore, bonding only by soldering can produce highly reliable bonding force. In many cases, the bonding only by soldering can provide necessary bonding force, so that the device can be soldered with other electronic components together with the vibrator, and this saves additional holding means for the vibrator. As a result, substantial improvement can be achieved in productivity.

The vibrator in accordance with the first embodiment is a cube and two faces of the cube can be used for bonding to the device, therefore this structure can use larger bonding area and gain stronger bonding force than a case where some protrusions are on a mounting face. When terminals are provided on the adjacent two faces, the adjacent section is good for mechanical coupling with the device.

Further the vibrator in accordance with the first embodiment has two mounting faces, i.e. bottom plate 12 and side plate 13, adjacent with each other and intersecting at right angles. Bottom plate 12 has electric coupling terminal 141, and side plate 13 has electric coupling terminal 142. Respective same functional terminals of both terminals are coupled with each other electrically and mechanically. The "coupling the same functional terminals" means, for instance, coupling GND to GND of both of the faces, or +terminal to +terminal of both of the faces. As such, when manufacturing the base forming the outer shell, the electric coupling terminals can be paired (one is on the bottom plate and the other is on the side plate), so that the construction of the shell can be simplified and downsized. This structure allows winding terminal 321 to be just coupled to terminal 141 on the bottom plate when winding 32 of the stator need to be electrically coupled to the terminal. This also contributes to downsize and simplify the structure of the outer shell.

The outer dimension of this vibrator measures the height from bottom plate 12 (Wz) approx. equal to the height from side plate 13 (Wx). When two vibrators are mounted to different mounting faces in different directions, since the heights become approx. the same, the vibrators waste little room, so that the device can be downsized. When different mounting directions are required responsive to the market's demand, since the heights of vibrators are approx. the same, the device need not modify its construction substantially. As a result, constructing specification of the device can be unified.

In this first embodiment, a movable body is constructed by a rotor having an unbalancer, and this movable body is an element of a mini dc motor. Since the mini dc motor enjoys an excellent energy conversion rate, it realizes large vibration with a low current. As a result, this structure can reduce the weights of both the electromagnetic vibrator and driving power supply. This improves portability of the device employing the vibrator and power supply.

(Second Exemplary Embodiment)

Figure 4:
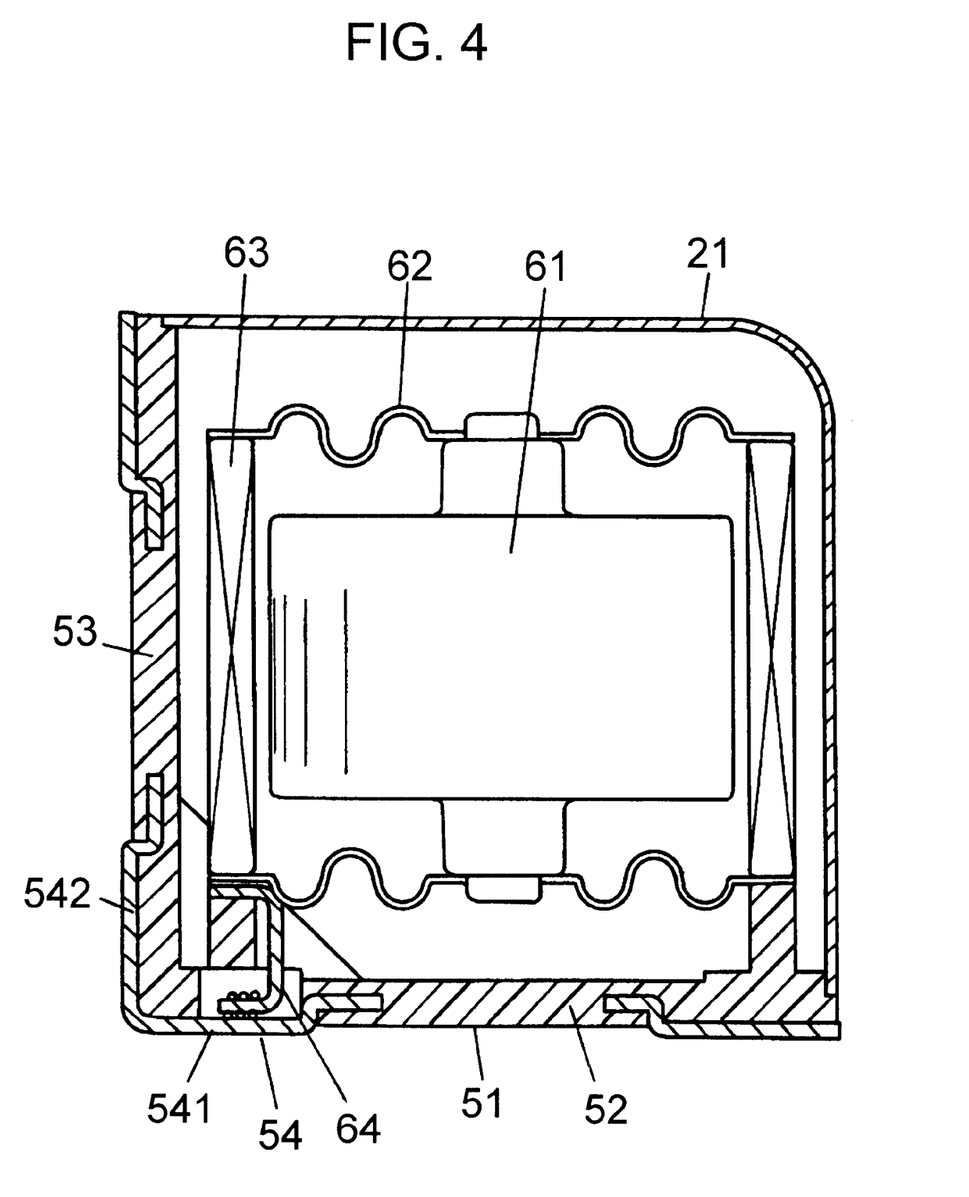
FIG. 4 is a lateral cross section illustrating a structure of a vibrator in accordance with a second exemplary embodiment of the present invention.

FIG. 4 is a lateral cross section illustrating a structure of a vibrator in accordance with the second exemplary embodiment of the present invention. This embodiment shows a vibrator by reciprocating motion.

In FIG. 4, an outer shell comprises base 51 made of molded resin and cover 21 made of thin metal, this is the same structure as the first embodiment. A movable body is vibrator 61 rested at the center and made of cylindrical magnet, which is magnetized axially. Vibrator 61 is supported at the both ends in radial direction so that it can move axially by bellows springs 62. Cylindrical coil 63—a driving body—is disposed close to both ends of vibrator 61 in axial direction. Those elements are mounted to bottom plate 52 of a base. An end of coil 63 is connected by wire-terminating-terminal 64 to inner face of electric coupling terminal 541 on the bottom plate. This vibrator has two mounting faces as same as the first embodiment, i.e. they are bottom plate 52 and side plate 53. The vibrator is mounted, and powered by ac current through electric coupling terminal 54, so that the movable body vibrates in the axial direction.

As discussed above, the vibrator has two mounting faces, i.e. one is vertical to the center axis and the other is parallel to the center axis. Therefore, the vibrator generates two vibrating directions depending on the mounted direction. As a result, the vibrator of the second embodiment effects the same advantages as discussed in the first embodiment.

(Third Exemplary Embodiment)

Figure 5:
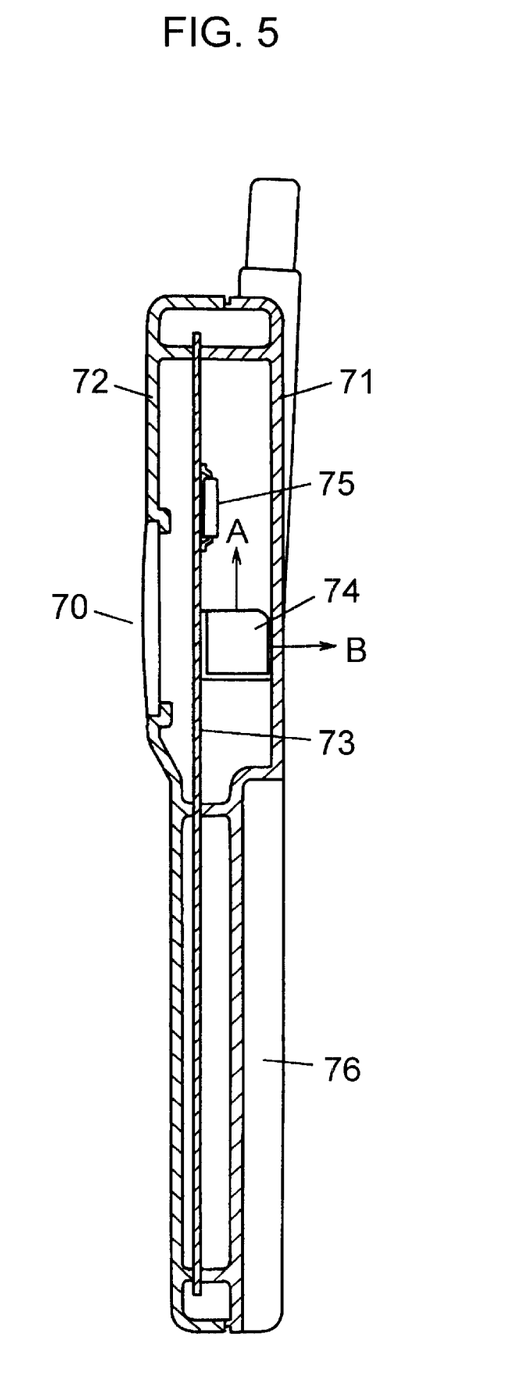
FIG. 5 is a lateral cross section of a cellular phone in accordance with a third exemplary embodiment of the present invention.

FIG. 5 is a lateral cross section of a cellular phone in accordance with the third exemplary embodiment of the present invention. This embodiment shows a cellular phone employing the vibrator demonstrated in the first or second embodiment.

In FIG. 5, vibrator 74 is integrated in cellular phone 70 as illustrated. The housing of cellular phone 70 comprises lower housing 71 and upper housing 72. Board 73 rests in the housing. Vibrator 74 and its driving circuit 75 are mounted to board 73. Other components are also mounted to board 73; however, they are not shown in the drawing. Cellular phone 70 is powered by battery 76 behind itself.

A vibrating direction of phone 70 can be chosen by changing the mounting direction of vibrator 74.

For instance, when vibrator 74 is mounted with directing its motor shaft in direction A shown in FIG. 5, vibrator 74 generates vibration in the direction of bottom plate of the cellular phone. Calling vibration can thus travel to chest when the phone is held in a breast pocket.

On the other hand, when vibrator 74 is mounted with directing its motor shaft in direction B shown in FIG. 5, vibrator generates vibration parallel to the bottom plate. This prevents the cellular phone from crawling on the desk. The cellular phone of this third embodiment has the simple construction such as the vibrator and other electronic components are mounted to the device by reflow-soldering, and yet, the phone kept in the same housing can generate two types of vibration.

(Fourth Exemplary Embodiment)

Figure 6:
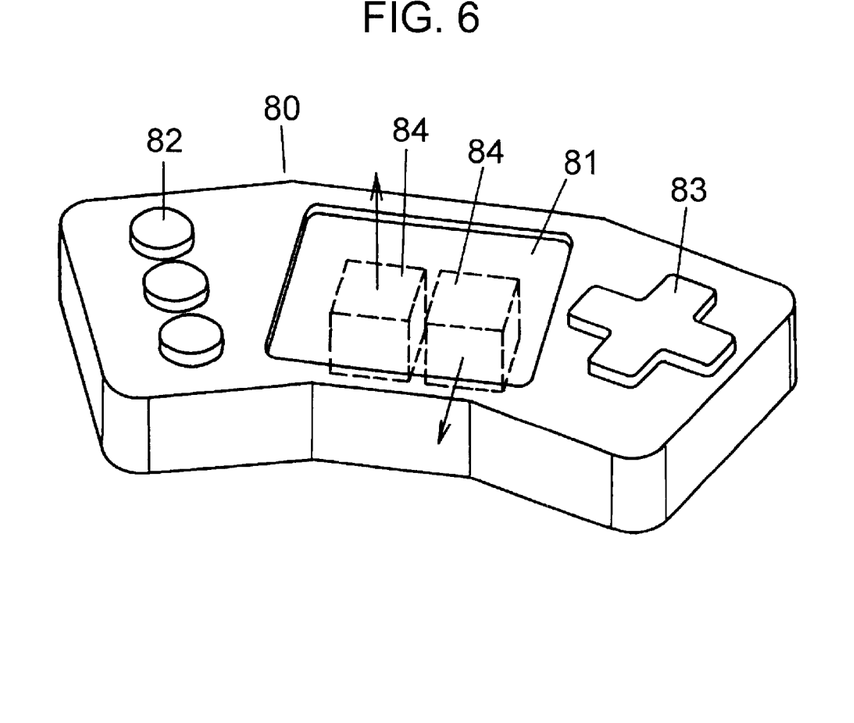
FIG. 6 is a perspective view of an amusement device in accordance with a fourth exemplary embodiment of the present invention.

FIG. 6 is a perspective view of an amusement device in accordance with the fourth exemplary embodiment of the present invention.

In FIG. 6, amusement device 80 includes display 81, operation buttons 82 and control pad 83. In the device, two vibrators 84 are integrated adjacently. Amusement device 80 is expected to produce larger vibration than the cellular phone discussed in the third embodiment, so that a fairly large vibrator, e.g. 10 by 10 mm square, is preferably used. The two vibrators are mounted in a manner such as one center axis is directed upward and the other center axis is directed in this side. This structure allows device 80 to generate vertical and lateral vibrations at the same time with vibrators 84. Thus two-dimensional vibration composite of vertical and lateral vibrations or three-dimensional vibration can be produced. Those vibrations are sensed by human body to produce novel as well as compound effect which a single vibration source cannot yield. As a result, a simulation in more reality is obtainable.

Those two vibrators can be mounted with their center axes in the same direction. When those two vibrators are driven at slightly different frequencies, humming vibration is produced due to the Doppler effect. When those two vibrators are disposed at both the ends of device and driven at the same frequency but with 180° phase difference, the device can produce large rolling vibration. The vibrators can be driven alternately to tell an alarm. When the device is used for a battling game, the vibrators can be assigned to each player. As such, a plurality of vibrators are integrated in the device and disposed in such a manner as their center axes lie in specific different directions or the same direction, and the vibrators are driven considering correlation between parameters such as position, drive-timing, frequency and phase. This structure and arrangement allows to yield the vibration containing information which a conventional single vibration source cannot produce. This quality improvement of the information can be compared to that of when monaural was advanced to stereophonic in audio equipment.

(Fifth Exemplary Embodiment)

Figure 7:
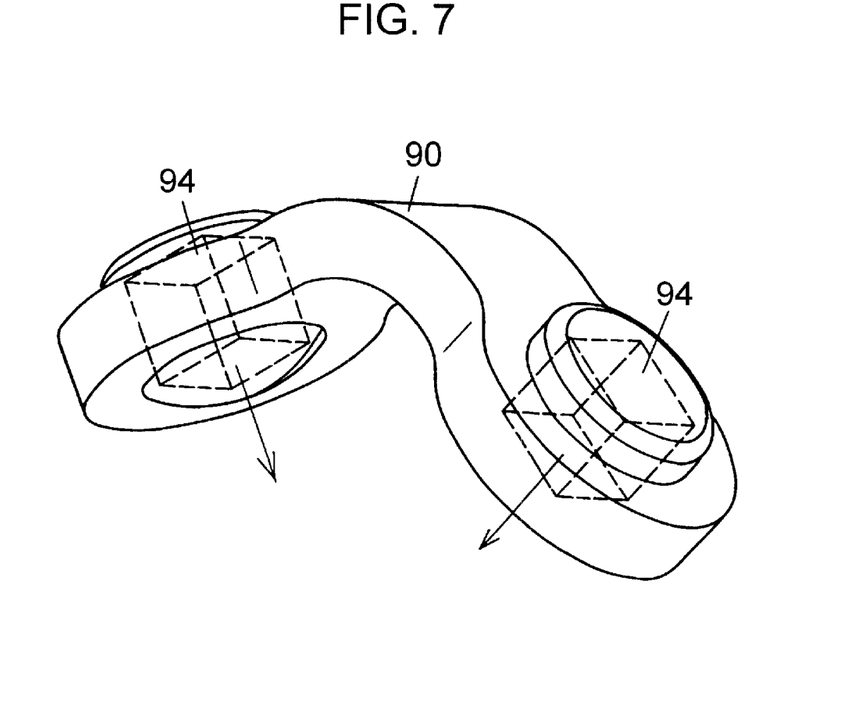
FIG. 7 is a perspective view of a massaging device in accordance with a fifth exemplary embodiment of the present invention.

FIG. 7 is a perspective view of a massaging device in accordance with the fifth exemplary embodiment of the present invention. This is an example of health instruments, and this portable massaging device eases stiff shoulder.

In FIG. 7, massaging device 90 has an arch-shaped housing fit to a human shoulder. Two vibrators 94 are rested at both the ends in the housing. In this case, the center axes of two vibrators form e.g. an angle of 75° (the angle may be variable). The vibrators are driven at the same frequency but with 180° phase difference, then two hemispheres ease alternately the shoulder.

Several embodiments have been demonstrated; however, the present invention is not limited only to those embodiments, and various modifications are available within the scope of the present invention. For instance, when a plurality of vibrators are integrated in a device, revolving type and reciprocating type can be mixed. Since these two types produce vibrations different in directions and characteristics, a human body can sense vibration different from what it senses from a device employing the same type of vibrators.

The present invention thus proves that two mounting faces vertical and parallel to the center line of an electromagnetic vibrator allow the vibrator to produce vibration in either direction depending on the mounting direction, thereby contributing to increasing versatility of the device. The present invention also proves that a plurality of electromagnetic vibrators arranged with their center axes in specific different directions or in the same direction can produce complex vibration. As a result, the present invention realizes a device having versatile functions such as producing vertical and lateral vibrations at the same time.

What is claimed is:

1. An electromagnetic vibrator comprising:

a moving body vibrating by one of revolving motion and reciprocating motion with respect to a center axis through being powered from outside thereof; and an outer shell supporting said moving body and having two mounting faces, one being vertical and the other being parallel to the center axis;

wherein the mounting faces have at least one of an electric coupling terminal and a mechanical coupling terminal.

2. An electromagnetic vibrator comprising:

a moving body vibrating by one of revolving motion and reciprocating motion with respect to a center axis through being powered from outside thereof; and an outer shell supporting said moving body and having two mounting faces, one being vertical and the other being parallel to the center axis;

wherein each of the mounting faces has an electric coupling terminal, and respective terminals—having the same function—of the electric coupling terminals are coupled with each other both electrically and mechanically.

3. An electromagnetic vibrator comprising:

a moving body vibrating by one of revolving motion and reciprocating motion with respect to a center axis through being powered from outside thereof; and an outer shell supporting said moving body and having two mounting faces, one being vertical and the other being parallel to the center axis;

wherein heights measured from the respective mounting faces are approximately the same.

4. A portable device employing an electromagnetic vibrator, said electromagnetic vibrator comprising:

a moving body vibrating by one of revolving motion and reciprocating motion with respect to a center axis through being powered from outside thereof; and an outer shell supporting said moving body and having two mounting faces, one being vertical and the other being parallel to the center axis;

wherein the mounting faces have a least one of an electric coupling terminal and a mechanical coupling terminal.

5. A portable device employing an electromagnetic vibrator, said electromagnetic vibrator comprising:

a moving body vibrating by one of revolving motion and reciprocating motion with respect to a center axis through being powered from outside thereof; and an outer shell supporting said moving body and having two mounting faces, one being vertical and the other being parallel to the center axis;

wherein each of the mounting faces has an electric coupling terminal, and respective terminals—having the same function—of the electric coupling terminals are coupled with each other both electrically and mechanically.

6. A portable device employing an electromagnetic vibrator, said electromagnetic vibrator comprising:

a moving body vibrating by one of revolving motion and reciprocating motion with respect to a center axis through being powered from outside thereof; and an outer shell supporting said moving body and having two mounting faces, one being vertical and the other being parallel to the center axis;

wherein heights measured from the respective mounting faces are approximately the same.

* * * * *